United States Patent [19]

O'Rourke et al.

[11] 4,035,042
[45] July 12, 1977

[54] THRUST BEARING

[75] Inventors: John Black O'Rourke, Uxbridge; Peter Gordon Stopp, Hillingdon, both of England

[73] Assignee: The Glacier Metal Company Limited, England

[21] Appl. No.: 668,466

[22] Filed: Mar. 19, 1976

[30] Foreign Application Priority Data

Mar. 20, 1975 United Kingdom ............ 11685/75

[51] Int. Cl.² ........................................ F16C 17/06
[52] U.S. Cl. ............................................. 308/160
[58] Field of Search ...................... 308/9, 160, 135

[56] References Cited

U.S. PATENT DOCUMENTS

| | | | |
|---|---|---|---|
| 3,142,519 | 7/1964 | Abramovitz | 308/160 |
| 3,154,355 | 10/1964 | McCafferty | 308/160 |
| 3,160,450 | 12/1964 | Gentiluomo | 308/160 |
| 3,814,487 | 6/1974 | Gardner | 308/160 |

Primary Examiner—Joseph F. Peters, Jr.
Assistant Examiner—Gene A. Church
Attorney, Agent, or Firm—Oblon, Fisher, Spivak, McClelland & Maier

[57] ABSTRACT

This invention is a thrust bearing comprising a circumferential ring of pivotally mounted thrust pads and in order to make a much more simple bearing than the previously known kind in which each pad is supported from a thrust ring mounted within the housing, in the present invention each pad is supported on its individual thrust pillar which is itself supported against a wall of the bearing housing. There is a ring for locating the pillars circumferentially but that does not play any part in carrying axial loads or in permitting tilting of each thrust pad on its pillar.

8 Claims, 4 Drawing Figures

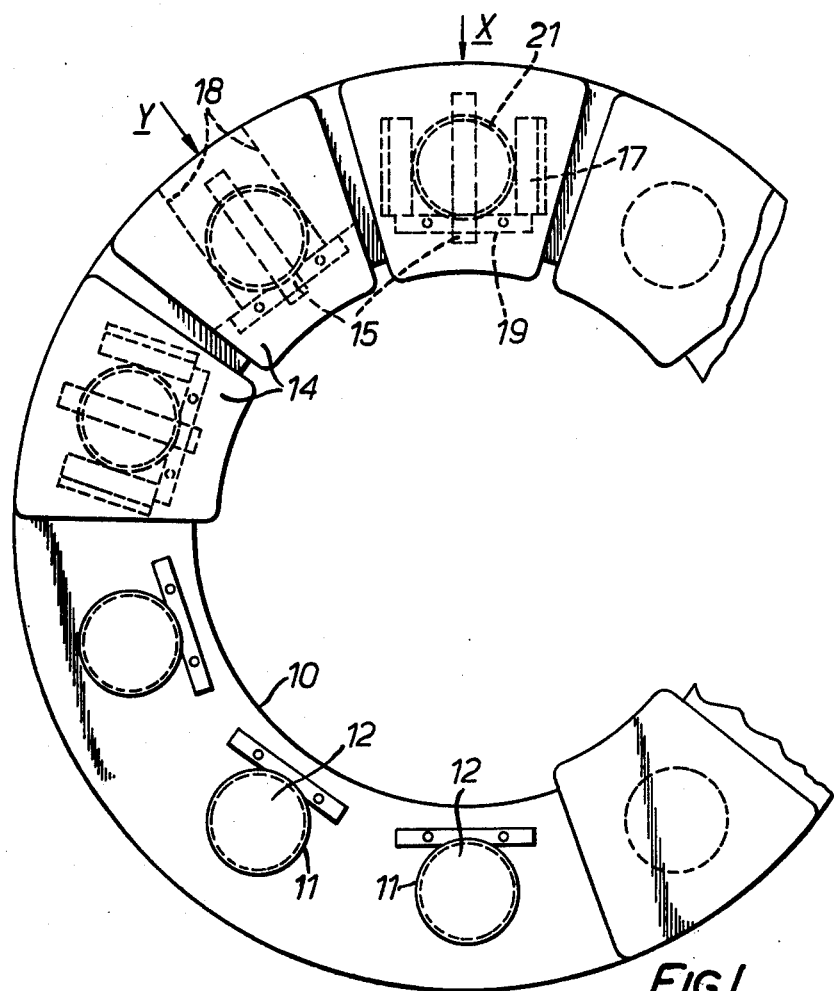
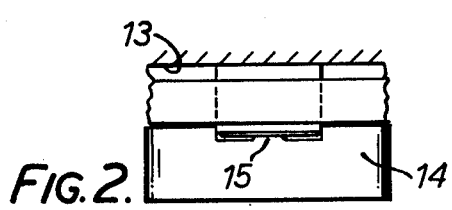
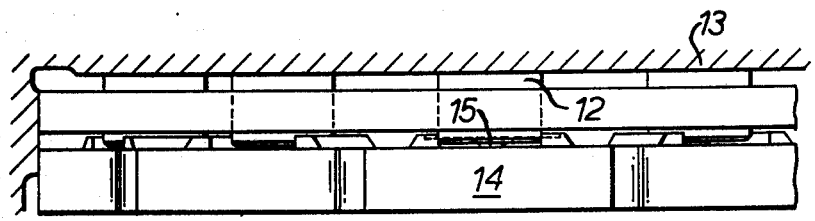

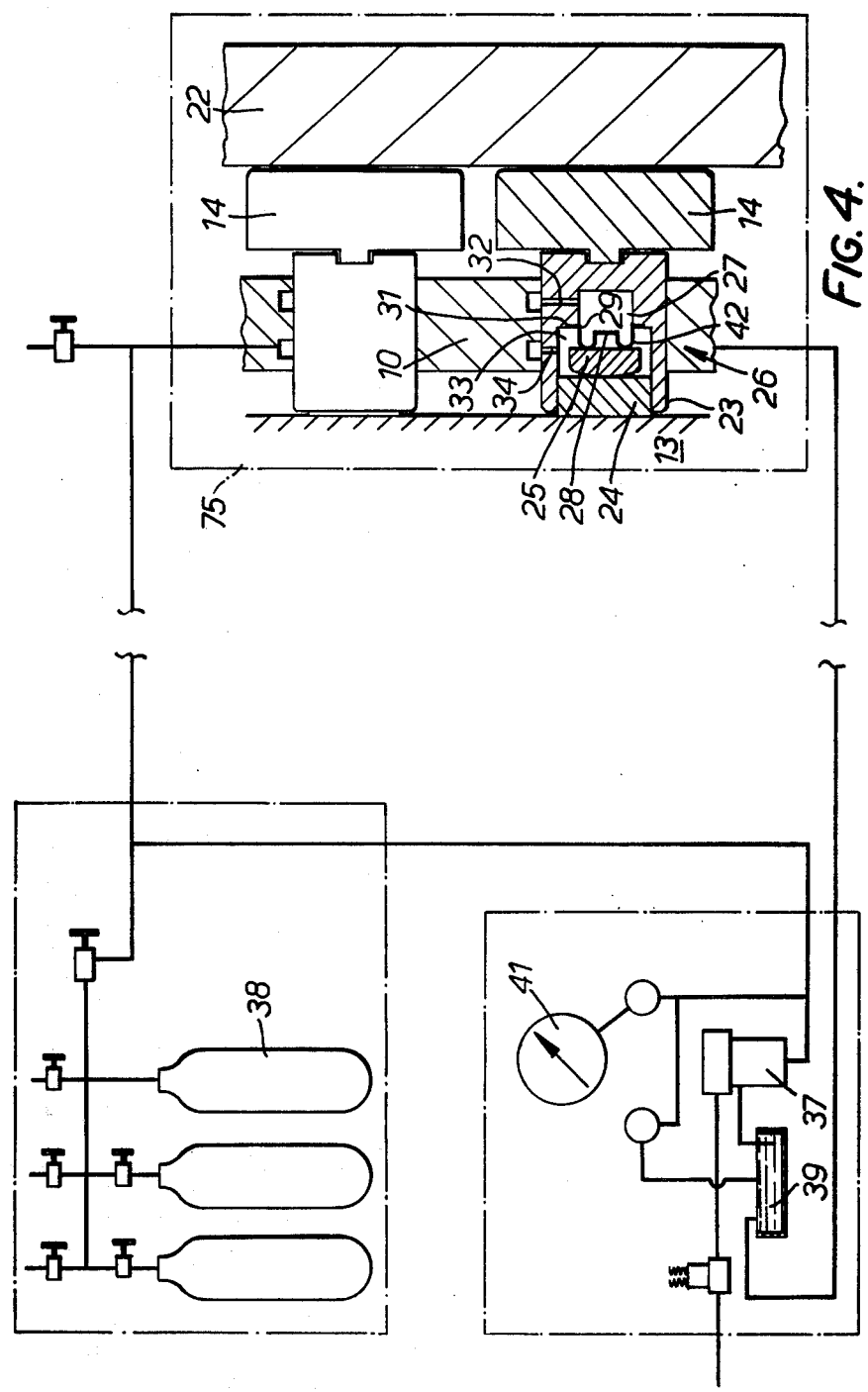

THRUST BEARING

This invention relates to thrust bearings comprising a housing containing an annular ring of thrust pads.

According to the present invention each thrust pad is mounted to be capable of tilting on its own thrust pillar, the pillars being located axially against a wall of the bearing housing and circumferentially by a cage ring.

It has previously been proposed to have a separate thrust ring within the housing which supports all the individual pad supports and which requires to be very accurately machined. That represents a considerable expense in a pad ring with a diameter of say 6 to 7 feet and unless such accurate machining is achieved the pads do not share equally the thrust load to be carried.

The arrangement of the present invention merely uses a cage ring to locate individual thrust pillars circumferentially and they are supported against the thrust loads by the wall of the bearing housing itself, and that represents a considerable economy in the design and manufacture of the thrust bearing.

In one form of the invention each thrust pillar includes a hydraulic chamber transferring load between the pad and the housing wall, and if the chambers in all the pillars are arranged to be supplied with hydraulic fluid at the same pressure, then each pad can automatically adjust itself in position so that they share the common thrust load equally. The supply of hydraulic fluid to the pillars is conveniently by way of one or more galleries in the cage ring.

The invention may be carried into practice in various ways and certain embodiments will now be described by way of example with reference to the accompanying drawings in which;

FIG. 1 is a diagrammatic plan view of a thrust bearing with certain of the thrust pads omitted;

FIG. 2 is a view looking in the direction of the arrow Y in FIG. 1;

FIG. 3 is a view seen in the direction of the arrow X in FIG. 1; and

FIG. 4 is a view partly corresponding to FIG. 3 of a modification of the bearing of FIGS. 1 - 3 and also including a hydraulic circuit.

The thrust bearing of FIGS. 1, 2 and 3 has an annular series of thrust pads 14 which between them define a generally annular surface which bears load from an annular thrust ring carried by a shaft extending through the centre of the thrust surface when the bearing is in use. Each pad 14 is supported on its own thrust pillar 12 and the thrust pillars themselves are supported directly on the rear wall 13 of the bearing housing, and they are held and located in a circumferentially spaced manner by a cage ring 10 having a series of holes in each of which one of the thrust pillars 12 is a fairly close fit. There may be a rubber pad between the pillars and the wall 13.

The rear face of each thrust pad 14 contains a recess 16 to accommodate the end of the thrust pillar 12 which extends through the cage ring 10, and at the centre of the recess 16 is a radially directed rib 15 whose face contacts the outer face of the thrust pillar so as to allow each thrust pad 14 to tilt in use under load about a radial axis defined by the rib 15. It would be equally possible for the rib to be on the face of the thrust pillar rather than on the rear face of the thrust pad. The rib need not be radially central of the pad.

The rear face of the thrust pad is also formed with or fitted with flanges 17 one on either side of the pillar to locate the pad in relation to the pillar circumferentially. If the thrust pad is cast then the flanges 17 can be cast with it. Alternatively they can be separately bolted or welded to the rear face while if as shown at the pad is made from steel plate, a radial recess can be machined in its rear face and the sides 18 of the recess can act as the flanges 17 to locate the pad on the thrust pillar circumferentially. A stop plate 19 is also formed on or secured to the underside of each pad 14 to provide location against the radially inner side of the thrust pillar, and that could engage in an under-cut in the pillar indicated generally at 21 to provide location in an axial direction.

The arrangement described is very convenient for a large bearing with a diameter of say a few feet, because it is not necessary to machine the opposed flat faces of the cage ring 10 precisely, and the rear face 13 of the housing is used for axial location of the thrust pads through the medium of the thrust pillars which can be much more easily machined to the correct length. The cage ring merely serves to locate the thrust pillars and each pad can tilt on its thrust pillar just as if it were supported on a conventional thrust ring. It is much simpler to form or machine the rear face 13 of the housing sufficiently precisely to locate the pillars 12 than it is to machine the face of a conventional thrust ring.

In the alternative embodiment shown in FIG. 4 the thrust collar 22 on the shaft is once again supported on the annular ring of tilting thrust pads 14 and although each of those is seated on its own thrust pillar which in turn is supported from the rear wall 13 of the housing, the construction of the thrust pillar is more complicated than in FIGS. 1, 2 and 3.

Thus the pillar comprises an external body 23 which can slide away from the surface 13 on a piston like member 24 seated on the surface 13 and carrying a base plate 25, a hydraulic load cell being indicated generally at 26.

The load cell has a hydraulic fluid chamber 27 defined in a recess in the member 23 closed by an elastomeric diaphragm 28 having an external flange 29 which is a close fit in a rebate 31 in the annular wall of the member 23 surrounding the recess 27. The inner face of the diaphragm flange 29 is serrated to provide a good hydraulic seal. The chamber 27 is filled with hydraulic fluid under pressure through a line 32, and any fluid which does leak past the seal 31 can be withdrawn from the space 33 through a line 34.

A common source of hydraulic fluid is used to provide fluid to the recesses 27 in all the thrust pillars so that each will have the same load urging the member 23 away from the surface 13 towards the underside of the thrust pad 14, and in that way it can be arranged that each thrust pad automatically takes its equal share of total thrust load.

The hydraulic lines 32 and 34 lead to a common pair of galleries 35 and 36 in the cage ring 10 and they are supplied with fluid through a conventional circulating supply system including an air driven hydraulic pump 37, hydraulic accumulators 38, an oil tank 39 to which the return line 34 is connected and a hydraulic pressure guage 41 which is responsive to the supply pressure and so gives a measure of the thrust load being supported. It is believed that a detailed description of that circuit is not necessary.

In each thrust pillar the load is transmitted between the thrust pad 14 and the housing surface 13 through the load cell since any tendency of pad 14 to move towards the surface 13 is accompanied by a tendancy of the base 25 to squash the diaphragm towards the base of the recess 27 at an annular ring 42 formed by a local corrugation in the wall of the diaphragm. All the thrust cells are identical and since the pressures in them all will be the same, the thrust load supported by each pillar will also be the same and a balanced thrust bearing will be achieved. Once again it has not been necessary to provide a separately machined thrust cage.

What we claim as our invention and desire to secure by Letters Patent is:

1. A thrust bearing comprising:
   a housing,
   an annular ring of thrust pads in the housing,
   a thrust pillar for each pad, each of said thrust pillars having opposed planar ends, and each pad being mounted on one of said planar ends of its pillar,
   means provided either on each of said thrust pillars or each of said thrust pads for rendering said thrust pads capable of tilting on said thrust pillars, the pillars being located axially by having the other planar ends thereof disposed against a wall of the bearing housing, and
   a cage ring locating the pillars circumferentially.

2. A bearing as claimed in claim 1 in which each pillar is a fit in a different aperture in the cage ring.

3. A bearing as claimed in claim 2 in which each pad is located on its pillar in directions perpendicular to the axis of the pillar.

4. A bearing as claimed in claim 1 wherein said means for rendering said pads tiltable comprises a radially extending ridge disposed on the surface of each pad cooperating with the end of its pillar.

5. A bearing as claimed in claim 1 including a hydraulic fluid chamber providing a load support between the pillar and the housing wall.

6. A bearing as claimed in claim 5 including a hydraulic system for establishing equal hydraulic pressure in each chamber.

7. A bearing as claimed in claim 6 including a pressure indicator.

8. A bearing as claimed in claim 6 including a gallery in the cage ring through which hydraulic fluid is supplied to the chambers.

* * * * *